(12) United States Patent
Koyama

(10) Patent No.: US 8,985,627 B2
(45) Date of Patent: Mar. 24, 2015

(54) STEERING SYSTEM AND CROSS JOINT

(75) Inventor: Takeshi Koyama, Neyagawa (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 14/237,658

(22) PCT Filed: Aug. 27, 2012

(86) PCT No.: PCT/JP2012/071569
§ 371 (c)(1),
(2), (4) Date: Feb. 7, 2014

(87) PCT Pub. No.: WO2013/031720
PCT Pub. Date: Mar. 7, 2013

(65) Prior Publication Data
US 2014/0174242 A1   Jun. 26, 2014

(30) Foreign Application Priority Data
Aug. 29, 2011   (JP) .................. 2011-186007

(51) Int. Cl.
*B62D 1/16* (2006.01)
*F16D 3/00* (2006.01)
(Continued)

(52) U.S. Cl.
CPC .. *B62D 1/18* (2013.01); *B62D 1/16* (2013.01); *B62D 1/20* (2013.01); *F16D 3/41* (2013.01); *F16D 3/38* (2013.01); *F16D 9/06* (2013.01)
USPC ................. 280/771; 74/492; 403/2; 464/136; 280/777

(58) Field of Classification Search
CPC ........ B62D 1/192; B62D 1/195; B62D 1/197; B21K 1/762; B21K 1/763; B21K 1/765; F16D 3/38; F16D 3/40; F16D 9/04; F16D 9/06; F16D 9/08

USPC .................... 74/492, 496, 500; 280/771, 777; 464/136, 32; 403/2
See application file for complete search history.

(56) References Cited

U.S. PATENT DOCUMENTS 3,241,336 A    3/1966  Nemtsov
4,371,358 A *  2/1983  Laue ........................... 464/136
(Continued)

FOREIGN PATENT DOCUMENTS

DE    38 18 330 A1   12/1989
JP    U-57-79228     5/1982
(Continued)

OTHER PUBLICATIONS

Extended Search Report issued in European Patent Application No. 12826838.0 dated May 26, 2014.
(Continued)

*Primary Examiner* — Paul N Dickson
*Assistant Examiner* — Laura Freedman
(74) *Attorney, Agent, or Firm* — Oliff PLC

(57) ABSTRACT

In a steering system that includes: an intermediate shaft on a steering wheel side; a pinion shaft on a steered wheel side; and a cross joint by which the intermediate shaft and the pinion shaft are rotatably connected to each other on a plane intersecting with each of the shafts, and that steers steered wheels by transmitting steering torque of a steering wheel from the intermediate shaft to the pinion shaft, a weakened portion is formed in a joint spider of the cross joint. The weakened portion can be identified in advance as a portion that breaks first. This makes it possible to realize a failure mode in which a vehicle is able to run by itself for a certain period of time after a failure.

11 Claims, 8 Drawing Sheets

(51) Int. Cl.
*F16D 9/00* (2006.01)
*B62D 1/18* (2006.01)
*B62D 1/20* (2006.01)
*F16D 3/41* (2006.01)
*F16D 3/38* (2006.01)
*F16D 9/06* (2006.01)

(56) References Cited

U.S. PATENT DOCUMENTS

| | | | |
|---|---|---|---|
| 6,336,868 B1 * | 1/2002 | Kurecka et al. | 464/134 |
| 6,734,406 B1 | 5/2004 | Lindenthal et al. | |
| 6,881,151 B1 | 4/2005 | Jantz et al. | |
| 7,682,254 B2 * | 3/2010 | Araki | 464/128 |
| 8,092,313 B2 * | 1/2012 | Shibahiraki et al. | 464/134 |
| 8,105,170 B2 * | 1/2012 | Mizuno et al. | 464/11 |
| 8,182,350 B2 * | 5/2012 | Mizuno et al. | 464/131 |
| 8,348,771 B2 * | 1/2013 | Mizuno | 464/11 |
| 2006/0135269 A1 | 6/2006 | Zhou et al. | |
| 2009/0242315 A1 | 10/2009 | Shibahiraki et al. | |

FOREIGN PATENT DOCUMENTS

| | | | |
|---|---|---|---|
| JP | 58093532 A * | 6/1983 | B21D 53/86 |
| JP | A-7-17413 | 1/1995 | |
| JP | 2004169874 A * | 6/2004 | F16D 3/38 |
| JP | 2007303575 A * | 11/2007 | |
| JP | A-2007-309473 | 11/2007 | |
| JP | 2007321924 A * | 12/2007 | |
| JP | A-2009-250268 | 10/2009 | |

OTHER PUBLICATIONS

International Search Report issued in International Application No. PCT/JP2012/071569 mailed Oct. 2, 2012.
International Preliminary Report on Patentability issued in International Application No. PCT/JP2012/071569 issued Mar. 4, 2014.

* cited by examiner

STEERING SYSTEM AND CROSS JOINT

CROSS-REFERENCE TO RELATED APPLICATIONS

This application claims priority to International Application No. PCT/JP2012/071569, filed on Aug. 27, 2012, and to Japanese Patent Application No. 2011-186007, filed on Aug. 29, 2011, the disclosures of both of which are incorporated herein by reference in their entireties.

TECHNICAL FIELD

The invention relates to a vehicle steering system including a cross joint, and a cross joint used in the steering system.

BACKGROUND ART

A vehicle steering system disclosed in Patent Document 1, for example, includes a steering shaft connected to a steering wheel, an intermediate shaft connected to the steering shaft via a cross joint, a pinion shaft connected to the intermediate shaft via another cross joint, and a rack shaft meshed with pinion teeth of the pinion shaft and connected to wheels. Each cross joint is formed of a joint spider having four shaft portions that form a cross shape as a whole. The pinion shaft and the rack shaft constitute a rack-and-pinion mechanism.

In the vehicle steering system, when the steering wheel is steered, the steering torque thereof (rotation of the steering wheel) is sequentially passed through the steering shaft and then intermediate shaft and then transmitted to the pinion shaft, so that the pinion shaft rotates. In association with the rotation of the pinion shaft, the rack shaft steers the wheels while making a linear motion.

PRIOR ART DOCUMENT

Patent Document

Patent Document 1: Japanese Patent Application Publication No. 2007-309473

SUMMARY OF THE INVENTION

Problem to be Solved by the Invention

A cross joint and an intermediate shaft are formed of various components such as a shaft, a joint spider, and yokes. However, the components vary in strength due to the differences in size, material and the like. Therefore, in the case where a failure occurs in the cross joint and the intermediate shaft due to aged degradation, it is difficult to identify a failure portion (a portion that breaks first) in advance. If a failure portion can be identified in advance, it is possible to realize a failure mode in which a vehicle is able to run by itself to a repair garage while maintaining the minimum functions for a certain period of time after a failure occurs in the cross joint and the intermediate shaft.

The invention is made in the light of the aforementioned circumstances, and an object of the invention is to provide a steering system and a cross joint that make it possible to realize a failure mode in which a vehicle is allowed to run by itself for a certain period of time after a failure, by making it possible to identify a portion that breaks first in the cross joint and its peripheral component (intermediate shaft).

Further, another object of the invention is to provide a steering system that makes it possible to break a cross joint and its peripheral component such that their breakage is easily detected.

Means for Solving the Problem

The invention according to claim 1 is a steering system (1) that includes: a first connection element (5) on a steering wheel (2) side; a second connection element (7) on a steered wheel (11) side; and a cross joint (6) by which the first connection element and the second connection element are rotatably connected to each other on a plane intersecting with each of the connection elements, and that steers steered wheels by transmitting steering torque of a steering wheel from the first connection element to the second connection element, characterized in that a weakened portion (60) is formed in a joint spider (23) of the cross joint.

The invention according to claim 2 is the steering system according to claim 1, characterized in that the weakened portion includes a cutout formed on an outer peripheral face of a shaft portion (46) of the joint spider.

The invention according to claim 3 is the steering system according to claim 1, characterized in that the weakened portion includes a constricted portion formed by partially reducing a diameter of a shaft portion of the joint spider.

The invention according to claim 4 is the steering system according to claim 2 or 3, characterized in that the weakened portion is formed on an outer peripheral face of a root portion of the shaft portion of the joint spider.

The invention according to claim 5 is the steering system according to claim 4, characterized in that the weakened portion is formed in each of an upstream-side end portion and a downstream-side end portion of the outer peripheral face of the shaft portion of the joint spider in a moving direction of the joint spider.

The invention according to claim 6 is the steering system according to claim 4, characterized in that the weakened portion is formed in an annular shape extending throughout a whole range in a circumferential direction, on the outer peripheral face of the shaft portion of the joint spider.

The invention according to claim 7 is the steering system according to claim 1, characterized in that a quenching treatment is performed on the weakened portion.

The invention according to claim 8 is the steering system according to claim 1, characterized in that the weakened portion is formed in a shaft portion (46A) of the joint spider, which is connected to the first connection element.

The invention according to claim 9 is the steering system according to claim 1, characterized in that the first connection element includes an intermediate shaft (5) that connects an input shaft (3) connected to the steering wheel and the second connection element to each other, and the second connection element includes a pinion shaft (7).

The invention according to claim 10 is a cross joint by which a first connection element on a steering wheel side and a second connection element on a steered wheel side are rotatably connected to each other on a plane intersecting with each of the connection elements, characterized in that a weakened portion is formed in a joint spider.

Note that, in the above description, the numbers or the like in the parentheses indicate reference numerals of corresponding components in the later-described embodiments, but these reference numerals are not intended to limit the scope of claims.

Effects of the Invention

According to the inventions in claims 1 and 10, in the cross joint, the joint spider breaks first surely at the weakened portion, so that it is possible to identify, in advance, a portion that breaks first in the cross joint and its peripheral component. This makes it possible to realize a failure mode in which a vehicle is able to run by itself for a certain period of time after a failure.

According to the invention in claim 2, it is possible to easily form the weakened portion by the cutout.

According to the invention in claim 3, it is possible to easily form the weakened portion by making the shaft portion of the joint spider partially constricted.

According to the invention in claim 4, because the weakened portion is formed in a portion where fatigue is easy to accumulate, such as the root portion of the shaft portion of the joint spider, it is possible to break the joint spider first surely at the weakened portion.

According to the invention in claim 5, if the weakened portion is formed at least in each of the upstream-side end portion and the downstream-side end portion of the shaft portion of the joint spider, it is possible to break the joint spider first surely at the weakened portion.

According to the invention in claim 6, if the weakened portion is formed throughout the whole circumference of the outer peripheral face of the shaft portion of the joint spider, it is possible to break the joint spider first surely at the weakened portion.

According to the invention in claim 7, it is possible to instantaneously break the joint spider at the weakened portion, and, further, it is possible to make a sound at the time when the joint spider breaks at the weakened portion. Therefore, it is possible to reliably inform an operator performing a steering operation, of breakage of the cross joint. That is, it is possible to break the cross joint and its peripheral component such that their breakage is easily detected.

According to the invention in claim 8, if the weakened portion is formed in the shaft portion of the joint spider, which is close to the steering wheel, the operator performing a steering operation is intuitively informed of the breakage of the joint spider at the time when the joint spider breaks at the weakened portion. That is, it is possible to break the cross joint and its peripheral component such that their breakage is easily detected.

According to the invention in claim 9, because the weakened portion is formed in the joint spider of the cross joint that connects the intermediate shaft having relatively good maintainability and the pinion shaft to each other, even if the joint spider breaks at the weakened portion, it is possible to easily replace the joint spider by removing and attaching the intermediate shaft.

MODES FOR CARRYING OUT THE INVENTION

Preferred embodiments of the invention will be described below with reference to the attached drawings.

Figure 1:
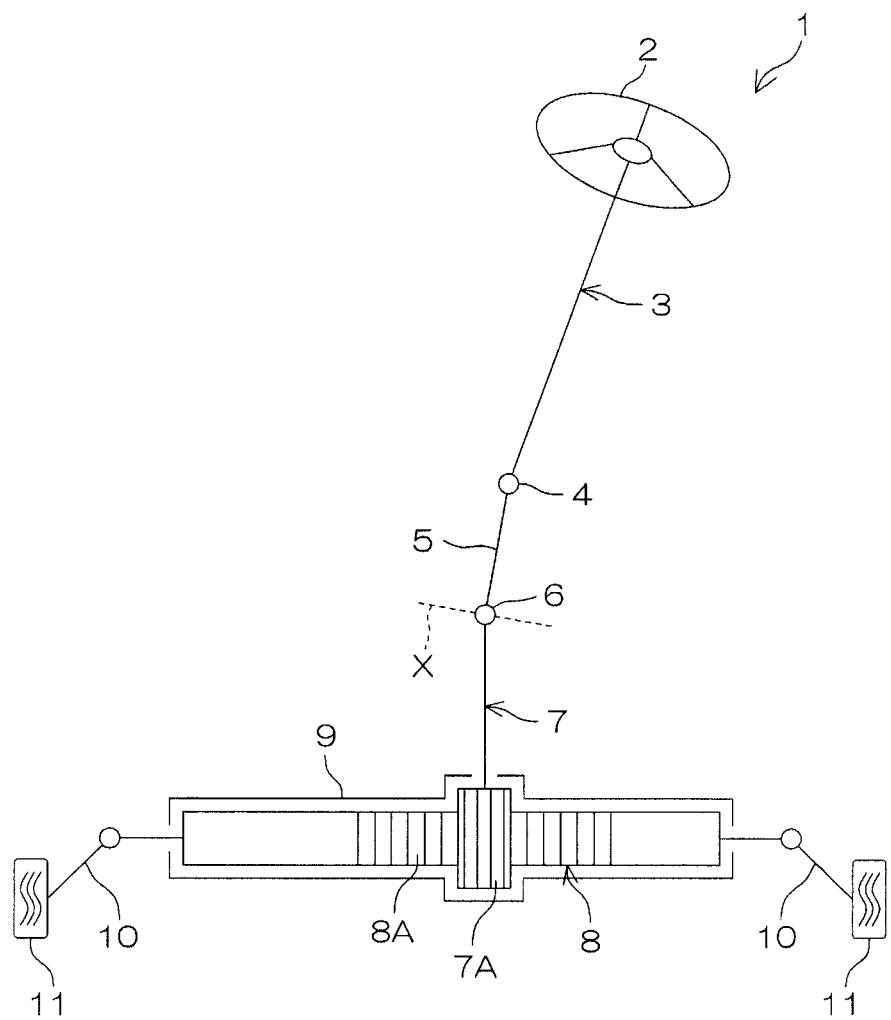
FIG. 1 is a schematic view illustrating the schematic configuration of a steering system 1 according to an embodiment of the invention.

FIG. 1 is a schematic view illustrating the schematic configuration of a steering system 1 according to an embodiment of the invention.

With reference to FIG. 1, the steering system 1 in this embodiment mainly includes a steering member 2, an input shaft (steering shaft) 3, a universal joint 4, an intermediate shaft 5 (first connection element), a cross joint 6, a pinion shaft 7 (second connection element), a rack shaft 8, and a rack housing 9.

As the steering member 2, for example, a steering wheel may be used. One end of the input shaft 3 is connected to the steering member 2. The other end of the input shaft 3 and one end of the intermediate shaft 5 are connected to each other via the universal joint 4. The other end of the intermediate shaft 5 and one end of the pinion shaft 7 are connected to each other via the cross joint 6. That is, the intermediate shaft 5 is interposed between the input shaft 3 and the pinion shaft 7 to connect the input shaft 3 and the pinion shaft 7 to each other. Note that the input shaft 3, the intermediate shaft 5, and the pinion shaft 7 are not located on the same straight line.

A pinion 7A is provided integrally with the other end of the pinion shaft 7. The rack shaft 8 has a rod-like shape elongated in the vehicle-width direction (right-left direction in FIG. 1). A rack 8A that meshes with the pinion 7A is formed in the rack shaft 8, and the pinion shaft 7 and the rack shaft 8 constitute a rack-and-pinion mechanism.

The rack housing 9 is a hollow body elongated in the vehicle width-direction, and is fixed to a vehicle body (not illustrated). The rack shaft 8 is inserted in the rack housing 9, and supported by the rack housing 9 via bearings or the like (not illustrated). In this state, the rack shaft 8 is slidable in the vehicle-width direction. Both end portions of the rack shaft 8 project outside the rack housing 9, and tie rods 10 are connected to the respective end portions of the rack shaft 8. The tie rods 10 are connected to steered wheels 11 via knuckle arms (not illustrated).

In such a steering system 1, when the steering member 2 is steered to rotate the input shaft 3, the pinion shaft 7 also rotates and the rotation of the pinion shaft 7 is converted by the pinion 7A and the rack 8A into a linear motion of the rack shaft 8 along the vehicle-width direction. Thus, steering of the steered wheels 11 on both sides of the rack shaft 8 is achieved.

Figure 2:
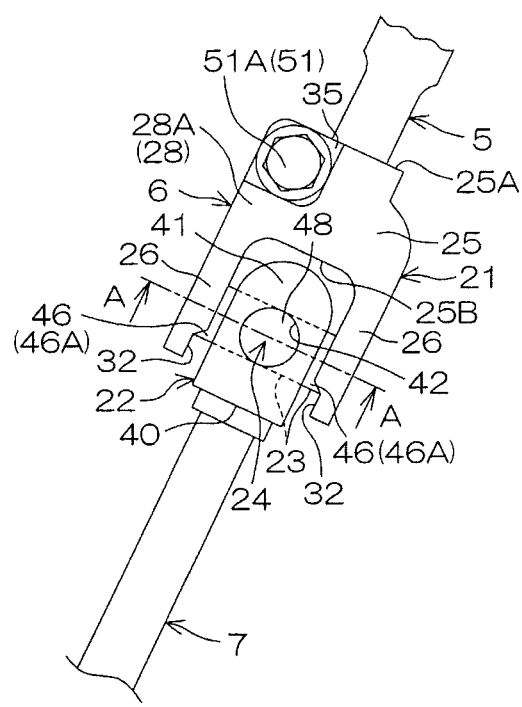
FIG. 2 is a view illustrating a cross joint 6 and its surrounding part extracted from the steering system 1.
Figure 3:
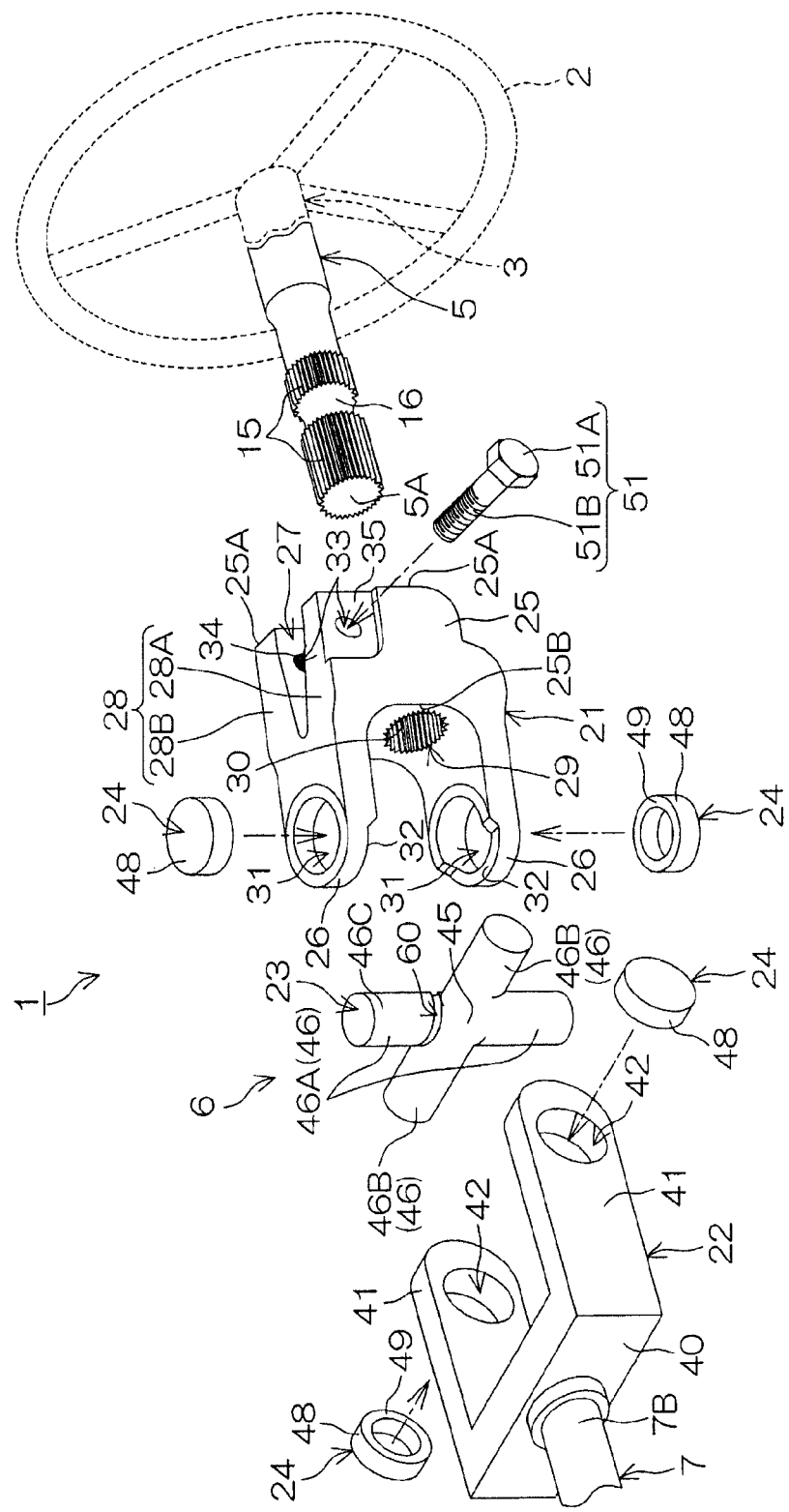
FIG. 3 is an exploded perspective view of the steering system 1, at position near the cross joint 6.
Figure 4:
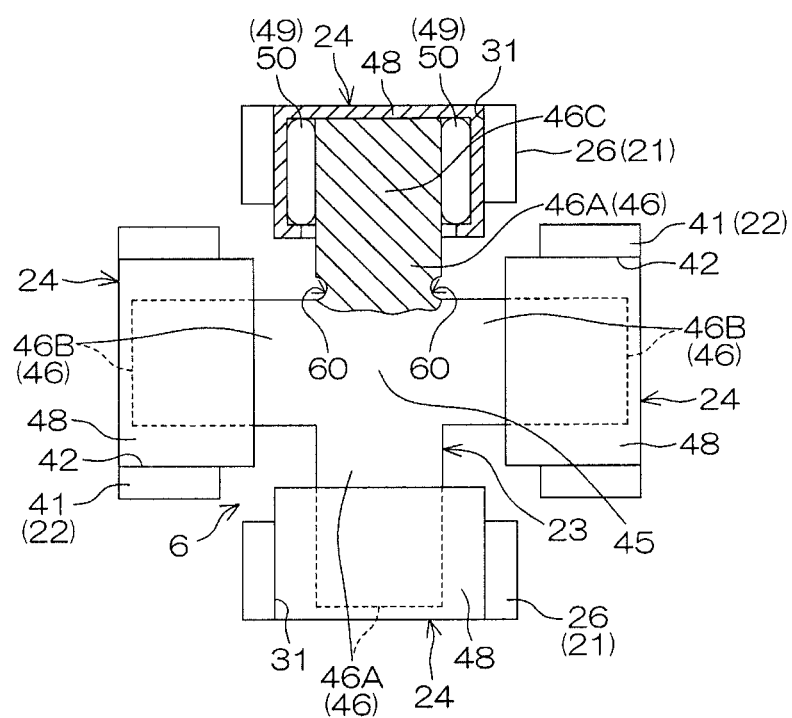
FIG. 4 is a sectional view taken along the line A-A in FIG. 2.

FIG. 2 is a view illustrating the cross joint 6 and its surrounding part extracted from the steering system 1. FIG. 3 is an exploded perspective view of the steering system 1, at position near the cross joint 6. FIG. 4 is a sectional view taken along the line A-A in FIG. 2.

The cross joint 6 and its surrounding part in the steering system 1 will be described in detail below. FIG. 2 illustrates part of the intermediate shaft 5, the entirety of the cross joint 6, and part of the pinion shaft 7.

With reference to FIG. 3, the intermediate shaft 5 is an elongate circular column made of metal, and its outside diameter is decreased or increased at a given portion in its axial direction as needed. In FIG. 3, the input shaft 3 and the steering member 2 are additionally illustrated by dotted lines for convenience of description. In the intermediate shaft 5, serrations 15 are formed throughout the whole circumference on an outer peripheral face of an end portion 5A connected to the cross joint 6. A positioning groove 16 is formed in the end portion 5A. The positioning groove 16 is recessed in a U-shape, and has an annular shape extending in the circumferential direction of the end portion 5A. The positioning groove 16 divides the serrations 15 formed on the end portion 5A in half in the axial direction of the intermediate shaft 5.

The cross joint 6 includes a first joint yoke 21, a second joint yoke 22, a joint spider 23, and bearing cups 24.

The first joint yoke 21 is formed by metal casting, for example. The first joint yoke 21 is a single-piece member having a base portion 25 located close to the intermediate shaft 5 in FIG. 3, a pair of arm portions 26, a slit 27, and a pair of flanges 28.

The base portion 25 is a hollow body, and has a generally cylindrical shape in this embodiment. In FIG. 3, the central axis of the generally cylindrical base portion 25 and the intermediate shaft 5 are located on the same straight line. An insertion hole 29 is formed in the base portion 25 at a position where the central axis thereof passes. The insertion hole 29 is a round hole extending through the base portion 25, and the insertion hole 29 constitutes a hollow portion of the base portion 25. The central axis of the insertion hole 29 is parallel to the central axis of the base portion 25. In the whole area of an inner peripheral face of the base portion 25, which defines the insertion hole 29, serrations 30 are formed.

Each of the paired arm portions 26 is a thin plate elongated in the axial direction of the base portion 25, and is formed integrally with the base portion 25. At an end portion (left end portion in FIG. 3) of the base portion 25, which is distant from the intermediate shaft 5 in FIG. 3, the arm portions 26 are provided at respective positions apart from each other by 180° in the circumferential direction, so as to extend in a direction (leftward in FIG. 3) away from the base portion 25. Thus, the first joint yoke 21 has a generally U-shape. In the base portion 25, the insertion hole 29 is exposed at a position between the paired arm portions 26. The paired arm portions 26 extend in parallel with each other, and have fitting holes 31 formed at the same position in their longitudinal direction. The fitting holes 31 are round holes extending through the respective arm portions 26 in the radial direction of the base portion 25, and are formed in distal end portions of the respective arm portions 26, which are apart from the base portion 25. In each of the arm portions 26, a step 32 is formed in the distal end of a face opposed to the arm portion 26 of the other arm portion 26. A portion of the arm portion 26 where the step 32 is formed is thinner than the other portion.

The slit 27 is formed in the base portion 25. The slit 27 cuts into one part of the periphery of the base portion 25 from one end 25A side (right end side that is close to the intermediate shaft 5 in FIG. 3) in the axial direction of the base portion 25. The one part of the periphery is located at the same position in the circumferential direction as one (the arm portion 26 on the upper side in FIG. 3) of the paired arm portions 26. The slit 27 extends along the insertion hole 29 and cuts the one part of the periphery of the base portion 25. Therefore, the whole area of the slit 27 communicates with the insertion hole 29. Note that the slit 27 does not communicate with the fitting hole 31 of the arm portion 26 located at the same position in the circumferential direction. In terms of the one end 25A, a reference numeral 25B is assigned to the other end of the base portion 25 in each drawing. The arm portions 26 extend from the other end 25B.

The paired flanges 28 are portions formed to form the slit 27 in the base portion 25. The paired flanges 28 are portions located at the opposite sides of the base portion 25 so as to face each other across the slit 27. The paired flanges 28 each have a plate-like shape, and extend in parallel to each other along the axial direction of the base portion 25. Hereinafter, the paired flanges 28 may be distinguished from each other such that one of them (on the near side in FIG. 3) will be referred to as a flange 28A, and the other one of them will be referred to as a flange 28B. Bolt holes 33 are formed in the respective flanges 28. Each of the bolt holes 33 extends in the orthogonal direction (the direction in which the paired flanges 28 are opposed to each other) orthogonal to the direction (the axial direction of the insertion hole 29) in which the insertion hole 29 extends. The bolt hole 33 of the flange 28A coincides with the bolt hole 33 of the flange 28B, when viewed from the orthogonal direction. A threaded portion 34 is formed only on an inner peripheral face of the flange 28B, which defines the bolt hole 33. On an outer face (a near side face in FIG. 3) of the flange 28A, a step 35 is formed in a region where the bolt hole 33 is formed. The portion of the flange 28A where the step 35 is formed is thinner than the other portion.

The second joint yoke 22 is made of metal, and, like the first joint yoke 21, the second joint yoke 22 is formed by casting, for example. The second joint yoke 22 includes a base portion 40 and a pair of arm portions 41. The base portion 40 has a rod-like shape extending in a direction orthogonal to the pinion shaft 7. The arm portions 41 are provided at respective end portions of the base portion 40 in its longitudinal direction, and each have a plate-like shape extending in a direction (toward the first joint yoke 21 in FIG. 3) orthogonal to the base portion 40. The paired arm portions 41 extend in parallel with each other, and have fitting holes 42 formed at the same position in their longitudinal direction. The fitting holes 42 are round holes extending through the respective arm portions 41 in the longitudinal direction of the base portion 40, and are formed in distal end portions of the respective arm portions 41, which are apart from the base portion 40.

The joint spider 23 is formed by metal casting or machining, for example. The joint spider 23 is a single-piece member having a block-shaped central portion 45 having a generally cubic shape close to a sphere, and four shaft portions 46 extending from the central portion 45 in a radial fashion. Each of the shaft portions 46 has a columnar shape. A pair of shaft portions 46A among the four shaft portions 46 is located on the same straight line, and the remaining pair of shaft portions 46B is located on the same straight line extending in a direction orthogonal to the shaft portions 46A. Therefore, the four shaft portions 46 form a cross shape as a whole. In each shaft portion 46, a portion connected to the central portion 45 is a root portion, and a portion farthest from the central portion 45 is a distal end portion. In FIG. 3, an end face of the distal end portion of each of the shaft portions 46 is flat along a direction orthogonal to the axial direction of the shaft portion 46 (the direction in which the shaft portion 46 extends).

Each of the bearing cups 24 includes a cup 48 serving as a cylindrical cover and an annular bearing 49 fitted in the cup 48. The bearing 49 fitted in the cup 48 is exposed on the outside of the cup 48. A plurality of needles 50 (see FIG. 4) arranged in a circular pattern may be used as the bearing 49. Four bearing cups 24 in total are provided for the cross joint 6 so as to correspond to the fitting holes 31 of the two arm portions 26 of the first joint yoke 21 and the fitting holes 42 of the two arm portions 41 of the second joint yoke 22.

The following describes assembly of such a cross joint 6, and a procedure of connecting the intermediate shaft 5 and the pinion shaft 7 to each other.

First, in the first bearing yoke 21, the distance between the arm portions 26 is temporarily increased with the use of a jig (not illustrated). At this time, one shaft portion 46 out of the paired shaft portions 46A of the joint spider 23 is inserted into the fitting hole 31 of one of the arm portions 26 from between the paired arm portions 26, and the other shaft portion 46 is inserted into the fitting hole 31 of the other one of the arm portions 26 from between the paired arm portions 26. After that, when the jig is removed from the arm portions 26, the distance between the paired arm portions 26 is returned to an original distance due to elasticity of the arm portions 26, so that the paired shaft portions 46A of the joint spider 23 are non-removably fitted to the fitting holes 31 of the corresponding arm portions 26.

Then, the bearing cups 24 are placed so as to face the fitting holes 31 of the respective arm portions 26 from outside. At this time, each of the bearing cups 24 is placed such that the bearing 49 exposed on the outside of the cup 48 is opposed to the fitting hole 31. In this state, the bearing cup 24 is moved to come close to the fitting hole 31 and then fitted in the fitting hole 31. The bearing cup 24 is press-fitted into the fitting hole 31. At this time, the jig (not illustrated) is attached to the steps 32 of the arm portions 26 so as to prevent the arm portions 26 from bending due to the press-fitting of the bearing cup 24.

In the state where the press-fitting of the bearing cups 24 has been completed, respective shaft portions 46A are inserted inside annular portions (the plurality of needles 50 disposed in a circular pattern) of the bearings 49 of the bearing cups 24 fitted in the respective fitting holes 31, and the joint spider 23 is rotatably supported by the arm portions 26 of the first bearing yoke 21 (see FIG. 4).

Subsequently, in the same procedure as that for the first bearing yoke 21, the distance between the paired arm portions 41 of the second bearing yoke 22 is temporarily increased with the use of a jig (not illustrated). At this time, one shaft portion 46 out of the remaining paired shaft portions 46B of the joint spider 23 is inserted into the fitting hole 42 of one of the arm portions 41 from between the paired arm portions 41, and the other shaft portion 46 is inserted into the fitting hole 42 of the other one of the arm portions 41 from between the paired arm portions 41. After that, when the jig is removed from the arm portions 41, the distance between the paired arm portions 41 is returned to an original distance due to elasticity of the arm portions 41, so that the paired shaft portions 46B of the joint spider 23 are non-removably fitted into the fitting holes 42 of the corresponding arm portions 41.

Then, the bearing cups 24 are press-fitted into the fitting holes 42 of the respective arm portions 41. In the state where the press-fitting of the bearing cups 24 has been completed, respective shaft portions 46B are inserted inside the bearings 49 of the bearing cups 24 fitted in the respective fitting holes 42, and the joint spider 23 is rotatably supported by the arm portions 41 of the second bearing yoke 22 (see FIG. 4). Thus, the cross joint 6 is completed.

In the cross joint 6 thus completed, the end portion 5A of the intermediate shaft 5 is inserted into the insertion hole 29 of the first joint yoke 21 from the one end 25A side of the base portion 25, as illustrated in FIG. 3. The intermediate shaft 5 after insertion is coaxial with the insertion hole 29, and the serrations 15 of the end portion 5A of the intermediate shaft 5 mesh with the serrations 30 of the insertion hole 29 of the base portion 25. That is, the base portion 25 is fitted to the intermediate shaft 5 inserted into the insertion hole 29 through serration-fitting. At this time, the positioning groove 16 of the end portion 5A is located at the same position as the bolt holes 33 of the respective flanges 28 of the first joint yoke 21 in the axial direction of the intermediate shaft 5.

Subsequently, one bolt 51 is disposed on the flange 28A side on which the step 35 is formed. At this time, a threaded portion 51B of the bolt 51 is located closer to the flange 28A than a head 51A thereof. Then, the bolt 51 is screwed into the flanges 28, so that the threaded portion 51B is inserted into the bolt hole 33 of the flange 28A and the bolt hole 33 of the flange 28B in this order. The threaded portion 51B that has passed through the bolt hole 33 of the flange 28A is fitted into the positioning groove 16 of the end portion 5A of the intermediate shaft 5, and then inserted into the bolt hole 33 of the flange 28B. Thus, the intermediate shaft 5 is positioned in the axial direction, and is not removed from the insertion hole 29 of the base portion 25.

When the bolt 51 is screwed into the flanges 28 to some extent, the head 51A is accommodated in the step 35, and the threaded portion 51B meshes with the threaded portion 34 in the bolt hole 33 of the flange 28B. When the bolt 51 is further screwed into the flanges 28 by a predetermined amount in this state, the flange 28A is pressed by the head 51A toward the flange 28B and the flange 28B is drawn toward the flange 28A by the threaded portion 51B, so that the flange 28A and the flange 28B bend so as to come close to each other. When the common bolt 51 is fitted into the bolt holes 33 and thus the flange 28A and the flange 28B come close each other, the whole base portion 25 having the flanges 28 is reduced in diameter, so that the insertion hole 29 is narrowed. When the insertion hole 29 is narrowed, the serrations 15 of the end portion 5A of the intermediate shaft 5 more firmly mesh with the serrations 30 of the insertion hole 29 of the base portion 25, so that the intermediate shaft 5 inserted into the insertion hole 29 comes into close contact with the base portion 25.

Thus, the connection of the intermediate shaft 5 to the cross joint 6 is completed (see FIG. 2).

Further, with reference to FIG. 3, one end portion 7B of the metal pinion shaft 7 is connected to a central portion of the base portion 40 of the second joint yoke 22 in its longitudinal direction. The second joint yoke 22 and the pinion shaft 7 may be fitted to each other through serration-fitting as in the case of the first joint yoke 21, or may be fitted to each other through screw-fitting. Thus, the connection of the pinion shaft 7 to the cross joint 6 is completed. Note that the second joint yoke 22 and the pinion shaft 7 may be formed as a single molded product, instead of being fitted to each other through serration-fitting or screw-fitting.

Note that, after the intermediate shaft 5 is connected to the first joint yoke 21 and the pinion shaft 7 is connected to the second joint yoke 22, the joint spider 23 may be fitted to the first joint yoke 21 and the second joint yoke 22.

Further, with reference to FIG. 1, the universal joint 4 may have the same configuration as that of the cross joint 6 (the first joint yoke 21, the second joint yoke 22, the joint spider 23, and the bearing cups 24).

In the state where the intermediate shaft 5 and the pinion shaft 7 are connected to the cross joint 6 and the input shaft 3 and the intermediate shaft 5 are connected to the universal joint 4 as described above, the steering member 2 is operated so as to be rotated in a predetermined direction. Then, the input shaft 3 is rotated along with the steering member 2, and steering torque of the steering member 2 is transmitted to the intermediate shaft 5 via the universal joint 4, so that the intermediate shaft 5 rotates in the same direction as the steering member 2. Thus, with reference to FIG. 3, that first joint yoke 21 of the cross joint 6, which is connected to the intermediate shaft 5, rotates in the same direction as the steering member 2. In association with the rotation of the first joint yoke 21, the paired shaft portions 46A of the joint spider 23, which are supported by the paired arm portions 26 of the first joint yoke 21, rotate about the central portion 45. Thus, the whole joint spider 23 rotates about the central portion 45 in the same direction as the steering member 2, and the second joint yoke 22 that supports the paired shaft portions 46B of the joint spider 23 rotates in the same direction as the joint spider 23, that is, the same direction as the steering member 2, so that the pinion shaft 7 rotates together with the second joint yoke 22.

Here, as described above, the intermediate shaft 5 and the pinion shaft 7 are not located on the same straight line (see FIG. 1). Therefore, strictly speaking, the joint spider 23 rotates three-dimensionally about the intermediate shaft 5 and the pinion shaft 7 that serve as centers of the rotation. At this time, not only forces along circumferential directions around the intermediate shaft 5 and the pinion shaft 7 that serve as the centers of the rotation, but also a force in a direction intersecting with the circumferential directions acts on the joint spider 23, so that a composite force in three dimensions acts on the joint spider 23.

Thus, with reference to FIG. 1, in the steering system 1, the steering torque of the steering member 2 is transmitted from the input shaft 3 to the intermediate shaft 5 via the universal joint 4, and further transmitted from the intermediate shaft 5 to the pinion shaft 7 via the cross joint 6, thus rotating the pinion shaft 7. As a result, in the steering system 1, in association with the rotation of the pinion shaft 7, the rack shaft 8 makes a linear motion as described above, thus achieving steering of each of the steered wheels 11. Further, from the above description, it is understood that, by the cross joint 6, the intermediate shaft 5 (on the steering member 2 side) and the pinion shaft 7 (on the steered wheel 11 side), which are not located on the same straight line, are rotatably connected to each other on a plane X intersecting with their axes.

Next, the joint spider 23 of the cross joint 6 will be described in more detail.

Figure 5A:
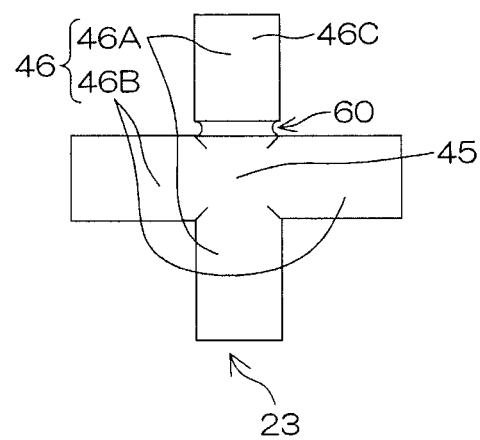
FIG. 5A is a side view of a joint spider 23 according to a first embodiment of the invention.
Figure 5B:
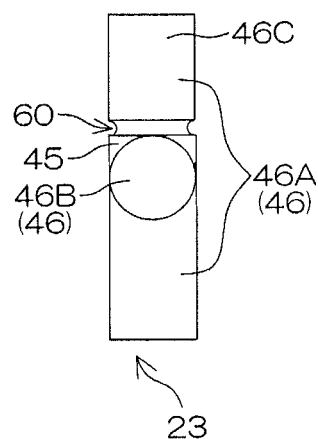
FIG. 5B is a view of the joint spider 23 as viewed from a direction orthogonal to FIG. 5A.
Figure 6A:
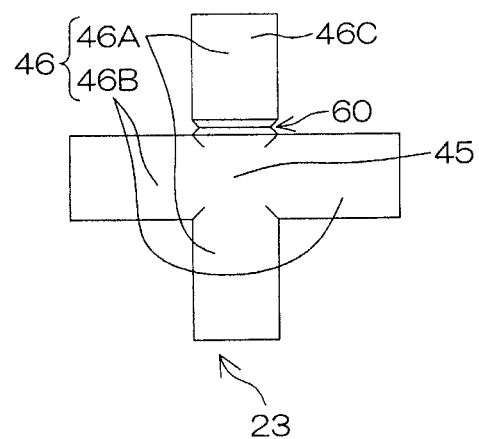
FIG. 6A is a side view of a joint spider 23 according to a second embodiment of the invention.
Figure 6B:
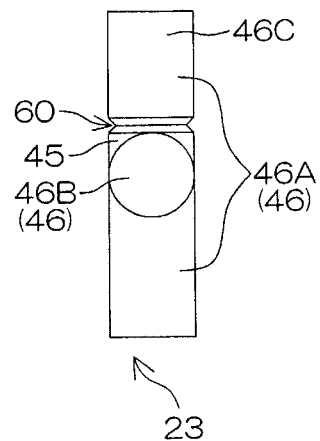
FIG. 6B is a view of the joint spider 23 as viewed from a direction orthogonal to FIG. 6A.
Figure 7A:
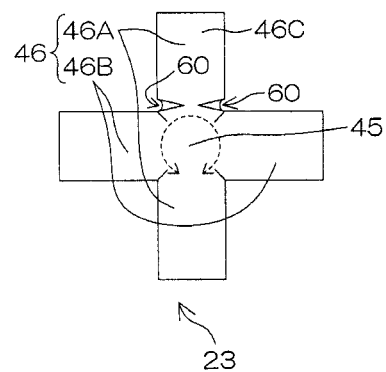
FIG. 7A is a side view of a joint spider 23 according to a third embodiment of the invention.
Figure 7B:
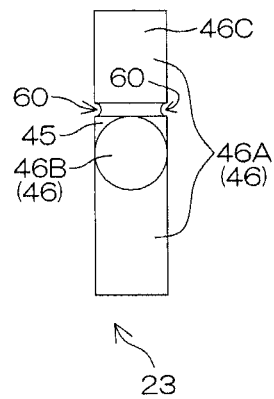
FIG. 7B is a view of the joint spider 23 as viewed from a direction orthogonal to FIG. 7A.
Figure 7C:
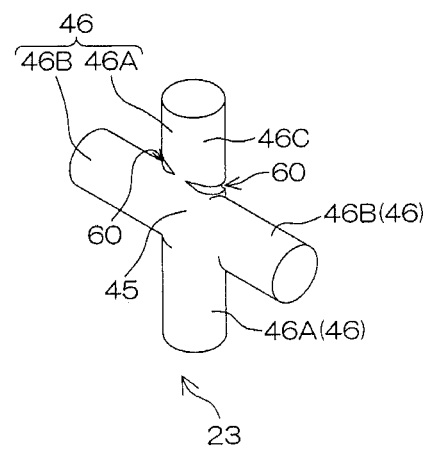
FIG. 7C is a perspective view of the joint spider 23.
Figure 8:
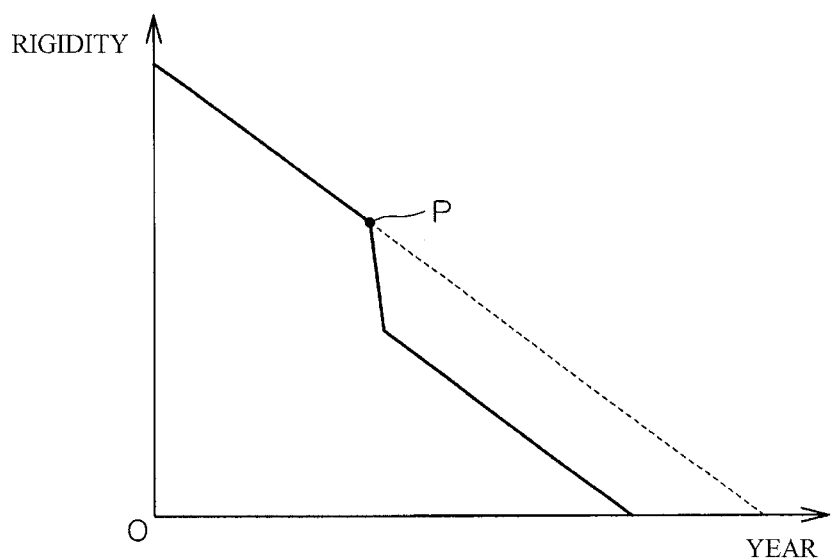
FIG. 8 is a graph illustrating aged deterioration of an intermediate shaft 5.

FIG. 5A is a side view of a joint spider 23 according to a first embodiment of the invention, and FIG. 5B is a view of the joint spider 23 as viewed from a direction orthogonal to FIG. 5A. FIG. 6A is a side view of a joint spider 23 according to a second embodiment of the invention, and FIG. 6B is a view of the joint spider 23 as viewed from a direction orthogonal to FIG. 6A. FIG. 7A is a side view of a joint spider 23 according to a third embodiment of the invention, FIG. 7B is a view of the joint spider 23 as viewed from a direction orthogonal to FIG. 7A, and FIG. 7C is a perspective view of the joint spider 23. FIG. 8 is a graph illustrating aged deterioration of the joint spider 23. Note that "side view" in each of FIG. 5 to FIG. 7 indicates a side view as viewed from a direction orthogonal to the directions in which all the four shaft portions 46 of the joint spider 23 extend.

With reference to FIG. 3, a weakened portion 60 is formed in the joint spider 23 according to the invention. The weakened portion 60 is formed in one (a shaft portion 46C extending upward in FIG. 3) of the paired shaft portions 46A supported by the respective arm portions 26 of the first joint yoke 21 on the steering member 2 side (that is, connected to the intermediate shaft 5).

The weakened portion 60 illustrated in FIG. 3 is illustrated in FIG. 5A and FIG. 5B, and is formed on the outer peripheral face of the root portion (an end portion on the central portion 45 side) of the shaft portion 46C (46A), and formed in an annular shape extending throughout a whole range in the circumferential direction of the outer peripheral face. The weakened portion 60 in FIG. 5A and FIG. 5B is a cutout recessed in a U-shape. Therefore, it is possible to easily form the weakened portion 60 by forming an annular cutout recessed in a U-shape, in the root portion of the shaft portion 46C.

Meanwhile, a weakened portion 60 in FIG. 6A and FIG. 6B is a cutout formed in an annular shape like the weakened portion 60 in FIG. 5A and FIG. 5B, but is different from the weakened portion 60 in FIG. 5A and FIG. 5B in that the weakened portion 60 in FIG. 6A and FIG. 6B is recessed in a V-shape. Each of the weakened portion 60 in FIG. 5A and FIG. 5B and the weakened portion 60 in FIG. 6A and FIG. 6B is formed by cutting the outer peripheral face of the shaft portion 46C with the use of a cutting tool or the like.

The weakened portion 60 may be formed of a constricted portion formed by partially reducing the diameter of (constricting) the root portion of the shaft portion 46C at the time when the entirety of the joint spider 23 is molded by casting, instead of forming the weakened portion 60 by cutting the outer peripheral face of the shaft portion 46C with the use of a cutting tool or the like as illustrated in FIG. 5A, FIG. 5B, FIG. 6A, and FIG. 6B. In the case where the shaft portion 46C of the joint spider 23 is partially constricted, the weakened portion 60 is automatically formed after casting, and thus, it is possible to easily form the weakened portion 60.

Further, as described above, the joint spider 23 rotates about the central portion 45 in association with the steering of the steering member 2 (see FIG. 3). In view of this, as illustrated in FIG. 7A to FIG. 7C, a weakened portion 60 may be formed in each of an upstream-side end portion and in a downstream-side end portion of the outer peripheral face of the root portion of the shaft portion 46C in a moving direction (a rotation direction, see a dotted arrow in FIG. 7A) of the joint spider 23, instead of being formed throughout the whole range of the shaft portion 46C in the circumferential direction (see FIG. 5A, FIG. 5B, FIG. 6A, and FIG. 6B).

In such a combination of the cross joint 6 and the intermediate shaft 5, the joint spider 23 of the cross joint 6 surely breaks first and instantaneously at the weakened portion 60, so that it is possible to identify, in advance, a portion that breaks first in the cross joint 6 and the intermediate shaft 5. Particularly, when the weakened portion 60 is formed in a portion where fatigue is easy to accumulate, such as the root portion of the shaft portion 46C of the joint spider 23, it is possible to break the joint spider 23 first surely at the weakened portion 60. In this case, the shaft portion 46C is broken from its root portion along with the breakage of the weakened portion 60.

Further, if the weakened portions 60 are formed at least in the upstream-side end portion and the downstream-side end portion of the shaft portion 46C in the moving direction of the joint spider 23 (see FIG. 7A to FIG. 7C), or if the weakened portion 60 is formed along the whole circumference of the outer peripheral face of the shaft portion 46C of the joint spider 23 (see FIG. 5A, FIG. 5B, FIG. 6A, and FIG. 6B), it is possible to surely break the joint spider 23 first at the weakened portion(s) 60.

Here, it is preferable to form the weakened portion 60 in only one shaft portion 46C rather than both of the paired shaft portions 46A. If both the shaft portions 46A have the weakened portions 60, there is a possibility that both the shaft portions 46A break at the same time. If both the shaft portions 46A break at the same time, the connection between the joint spider 23 and the first yoke 21 is completely cancelled. Thus, the steering torque of the steering member 2 is no longer transmitted to the pinion shaft 7 from the intermediate shaft 5, and it becomes difficult to steer the steered wheels 11 (to allow a vehicle to run by itself) (see FIG. 1 and FIG. 3).

Note that in the case where the weakened portions 60 are formed in the upstream-side end portion and the downstream-side end portion of the shaft portion 46C (see FIG. 7A to FIG. 7C), the weakened portions 60 may be formed in the upstream-side end portion and the downstream-side end portion over a certain length of range in the circumferential direction of the shaft portion 46C instead of being formed in a pinpoint narrow range, in consideration of the facts that the joint spider 23 rotates three-dimensionally and the composite force in three dimensions acts on the rotating joint spider 23. Thus, the composite force surely acts on the weakened portions 60, which makes it possible to surely break the joint spider 23 first at the weakened portions 60.

The graph in FIG. 8 illustrates a state (aged deterioration of the intermediate shaft 5) where the rigidity of the intermediate shaft 5 decreases over the years, where the abscissa axis indicates the elapsed years and the ordinate axis indicates the rigidity (torsional rigidity) of the entirety of the intermediate shaft 5 (including the cross joint 6). In the case where the weakened portion 60 is not formed in the joint spider 23 of the cross joint 6, the rigidity of the intermediate shaft 5 gradually decreases to zero at a substantially constant rate (see a dotted line portion). Therefore, when one of the shaft portions 46 of the joint spider 23 breaks, all the other shaft portions 46 are on the brink of breakage, and therefore the life of the entirety of the intermediate shaft 5 is about to end. Therefore, even if the steering member 2 is steered, it is difficult to keep the vehicle running by itself by steering the steered wheels 11 by transmitting the steering torque to the pinion shaft 7 from the intermediate shaft 5 (see FIG. 1 and FIG. 3). Further, in the case where the entirety of the intermediate shaft 5 gradually deteriorates in this way, it is difficult even for a person who steers the steering member 2 to detect how much the intermediate shaft 5 has deteriorated until the life of the entirety of the intermediate shaft 5 ends.

On the other hand, in the case where the weakened portion 60 is formed in the joint spider 23 as in the present invention, the rigidity of the intermediate shaft 5 is as follows; even if the shaft portion 46C having the weakened portion 60 breaks due to fatigue accumulated to a certain extent (see a point P in the graph in FIG. 8), all the other shaft portions 46 maintain sufficient rigidity. Therefore, the rigidity of the entirety of the intermediate shaft 5 rapidly decreases at a certain rate when the shaft portion 46C having the weakened portion 60 breaks. However, even after the rigidity decreases, the rigidity is maintained at such a degree that the intermediate shaft 5 is able to exercise its function, and the life of the entirety of the intermediate shaft 5 still remains, so that the intermediate shaft 5 is able to function as a product for a certain period of time (see a solid line part after the point P in the graph in FIG. 8).

More specifically, with reference to FIG. 3, even if the shaft portion 46C breaks and snaps, the shaft portion 46A (the shaft portion 46A that is different from the shaft portion 46C) that does not break is still connected to the first yoke 21, and therefore, it is possible to transmit the steering torque to the second yoke 22 from the first yoke 21 via the shaft portion 46A and the paired shaft portions 46B (that is, three shaft portions 46). Further, when the arm portions 26 of the first yoke 21 make contact with the arm portions 41 of the second yoke 22 along with its rotation, it is also possible to transmit the steering torque to the second yoke 22 from the first yoke 21. Therefore, even if the steering member 2 is steered, it is still possible to steer the steered wheels 11 by transmitting the steering torque to the pinion shaft 7 from the intermediate shaft 5, and thus, the vehicle is able to run by itself to a nearest repair garage or the like. That is, if the weakened portion 60 is formed in one shaft portion 46 (46C) of the joint spider 23 as described above, it is possible to notify a user of the breakage of the joint spider 23 in the intermediate shaft 5 before the vehicle becomes unable to run by itself. Further, it is possible to identify, in advance, the weakened portion 60 of the joint spider 23, as a portion that breaks first in the cross joint 6 and its peripheral component (the intermediate shaft 5), which makes it possible to realize a failure mode (see the solid line part in the graph in FIG. 8) in which the vehicle is able to run by itself for a certain period of time after failure.

The intermediate shaft 5 may have a useful life that is shorter than the life, in addition to the life. The useful life here is a period during which the intermediate shaft 5 is able to function as a product. After this period elapses, it is desirable to change a necessary component (the joint spider 23 of the cross joint 6, etc.) of the intermediate shaft 5 as soon as possible before the intermediate shaft 5 reaches the end of the life. As previously described, the timing at which the joint spider 23 breaks at the weakened portion 60 is preferably just after the useful life ends, but long before the end of the life. If this timing comes before the useful life ends, such a waste occurs that although the intermediate shaft 5 (including the cross joint 6) is still able to function as a product, the joint spider 23 is changed earlier than necessary. If this timing comes around the time when the intermediate shaft 5 reaches the end of the life, the vehicle is in a state where it is hardly able to run by itself at the time when the shaft portion 46C breaks finally, as described earlier.

Note that in the previously described embodiment, the weakened portion 60 is formed, as a cutout or a constricted portion, along the whole circumference or in two portions on the circumference of the root portion of the shaft portion 46C. Further, the cutout or the constricted portion is formed so as to have a U-shaped or V-shaped section (see FIG. 5A, FIG. 5B, FIG. 6A, FIG. 6B, and FIG. 7A to FIG. 7C). The configuration of the weakened portions 60 may be modified as needed. For example, whether the weakened portion 60 is formed along the whole circumference or in two portions on the circumference of the root portion of the shaft portion 46C may be determined based on the convenience of machining. Further, if the weakened portion 60 in a form of a cutout or a constricted portion having a V-shaped section is employed (see FIG. 6A, FIG. 6B), a stress is relatively easily concentrated on a corner (a deepest portion) of the V-shaped weakened portion 60. Therefore, it is possible to advance a breakage timing of the joint spider 23 at the weakened portion 60. On the other hand, if this breakage timing is to be delayed, the weakened portion 60 in a form of a cutout or a constricted portion having a U-shaped section on which a stress is concentrated relatively moderately may be employed (see FIG. 5A, FIG. 5B).

Further, in the joint spider 23 in any one of FIG. 5A, FIG. 5B, FIG. 6A, FIG. 6B, and FIG. 7A to FIG. 7C, the weakened portion 60 is formed in the shaft portion 46A (46C) of the joint spider 23, which on the side close to the steering member 2 (the side connected to the intermediate shaft 5, and the side to which the steering torque of the steering member 2 is transmitted first) (see FIG. 3). Therefore, when the joint spider 23 breaks at the weakened portion 60 during steering of the steering member 2, for example, a backlash of the steering member 2 suddenly increases along with a sudden decrease of the rigidity (see the point P in FIG. 8) of the joint spider 23. Therefore, a sudden change of a steering feeling of the steering member 2 allows an operator of the steering member 2 to be intuitively informed of the breakage of the cross joint 6. That is, it is possible to break the cross joint 6 and its peripheral component (the intermediate shaft 5) such that their breakage is easily detected. Note that with regard to the backlash, when the steering member 2 is steered, for example, with the breakage of the joint spider 23 at the weakened portion 60, the backlash corresponding to a steering angle of approximately 7 to 10° may occur suddenly.

In the joint spider 23, a quenching treatment is performed at least on the weakened portion 60. More specifically, after the weakened portion 60 is formed in the joint spider 23, the quenching treatment is performed on the surface of the weakened portion 60. It is preferable that the hardness of the surface of the weakened portion 60 that has been subjected to the quenching treatment be 60 to 64 HRC. By performing the quenching treatment as described above, it is possible to instantaneously break the joint spider 23 at the weakened portion 60, and, in addition, it is possible to make a sound at the time when the joint spider 23 breaks at the weakened portion 60. This allows the operator of the steering member 2 to be surely informed of the breakage of the cross joint 6. That is, it is possible to break the cross joint 6 and its peripheral component (the intermediate shaft 5) such that their breakage is easily detected. Further, by performing the quenching treatment on the weakened portion 60, it is possible to restrain variations in strength in the weakened portion 60 and to break the joint spider 23 surely at the weakened portion 60 when a predetermined amount of fatigue accumulates. This makes it possible to easily estimate the breakage timing of the joint spider 23 at the weakened portion 60.

The weakened portion 60 is formed in the joint spider 23 of the cross joint 6 that connects the intermediate shaft 5 having relatively good maintainability and the pinion shaft 7. Therefore, even if the joint spider 23 breaks at the weakened portion 60, it is possible to easily replace the joint spider 23 by removing and attaching the intermediate shaft 5 (see FIG. 1 to FIG. 3). Further, in the steering system 1, the fact that a portion that breaks first (a weakest portion) in a transmission system for the steering torque of the steering member 2 is the intermediate shaft 5-side shaft portion 46C (46A) of the joint spider 23 of the cross joint 6 is known in advance. In view of this, it is necessary to prepare, in advance, a joint spider 23 and an intermediate shaft 5 to which a cross joint 6 is connected, as replacement (maintenance) components. Thus, it is possible to improve the maintainability (in other words, maintenance performance).

As described above, according to the invention, the weakened portion 60 is intentionally formed in the joint spider 23 in which it is easy to identify a broken portion, and further, the weakened portion 60 is formed only in one shaft portion 46A (46C) of the joint spider 23 such that the vehicle is able to run by itself for a while even after the joint spider 23 breaks at the weakened portion 60. With such a configuration, in the steering system 1, it is possible to identify a portion that breaks first due to deterioration, thus allowing the vehicle to run by itself to a repair garage even if the shaft portion 46C breaks. Thus, it is possible to improve the usability of the whole vehicle.

The invention is not limited to the embodiments described as above, and various modifications may be made within the scope of claims.

For example, the weakened portion 60 is formed in the root portion of the shaft portion 46C. However, the weakened portion 60 may be formed in a portion of the shaft portion 46C, which is closer to the distal end thereof, so as to adjust the breakage timing of the joint spider 23, or the like.

Further, in the cross joint 6, the second joint yoke 22 may have the same configuration as that of the first joint yoke 21. Further, the application of the cross joint 6 is not limited to the steering system 1, but the cross joint 6 is applicable to any kind of device that connects two shafts that are not present on the same straight line.

DESCRIPTION OF THE REFERENCE NUMERALS

1 ... STEERING SYSTEM
2 ... STEERING MEMBER
3 ... INPUT SHAFT
5 ... INTERMEDIATE SHAFT
6 ... CROSS JOINT
7 ... PINION SHAFT
11 ... STEERED WHEEL
23 ... JOINT SPIDER
46 ... SHAFT PORTION
46A ... SHAFT PORTION
46C ... SHAFT PORTION
60 ... WEAKENED PORTION
X ... PLANE

The invention claimed is:

1. A steering system that includes:
   a first torque transmission member on a steering wheel side;
   a second torque transmission member on a steered wheel side; and
   a cross joint by which the first torque transmission member and the second torque transmission member are rotatably connected to each other on a plane intersecting with each of the torque transmission members, and that steers steered wheels by transmitting steering torque of a steering wheel from the first torque transmission member to the second torque transmission member, wherein:
   a joint spider of the cross joint comprises paired upstream-side shaft portions and paired downstream-side shaft portions, and
   a weakened portion is formed in only one of the paired upstream-side shaft portions and/or in only one of the paired downstream-side shaft portions of the joint spider of the cross joint.

2. The steering system according to claim 1, wherein the weakened portion includes a cutout formed on an outer peripheral face of a shaft portion of the joint spider.

3. The steering system according to claim 2, wherein the weakened portion is formed on an outer peripheral face of a root portion of the shaft portion of the joint spider.

4. The steering system according to claim 3, wherein the weakened portion is formed in each of an upstream-side end portion and a downstream-side end portion of the outer peripheral face of the shaft portion of the joint spider in a moving direction of the joint spider.

5. The steering system according to claim 3, wherein the weakened portion is formed in an annular shape extending throughout a whole range in a circumferential direction, on the outer peripheral face of the shaft portion of the joint spider.

6. The steering system according to claim 1, wherein the weakened portion includes a constricted portion formed by partially reducing a diameter of a shaft portion of the joint spider.

7. The steering system according to claim 6, wherein the weakened portion is formed on an outer peripheral face of a root portion of the shaft portion of the joint spider.

8. The steering system according to claim 1, wherein a quenching treatment is performed on the weakened portion.

9. The steering system according to claim 1, wherein the weakened portion is formed in a shaft portion of the joint spider, which is connected to the first torque transmission member.

10. The steering system according to claim 1, wherein:
- the first torque transmission member includes an intermediate shaft that connects an input shaft connected to the steering wheel and the second torque transmission member to each other; and
- the second torque transmission member includes a pinion shaft.

11. A cross joint by which a first torque transmission member on a steering wheel side and a second torque transmission member on a steered wheel side are rotatably connected to each other on a plane intersecting with each of the torque transmission members, wherein:
- a joint spider of the cross joint comprises paired upstream-side shaft portions and paired downstream-side shaft portions, and
- a weakened portion is formed in only one of the paired upstream-side shaft portions and/or in only one of the paired downstream-side shaft portions of the join spider of the cross joint.

* * * * *